United States Patent
Baughman et al.

(10) Patent No.: US 11,056,104 B2
(45) Date of Patent: Jul. 6, 2021

(54) CLOSED CAPTIONING THROUGH LANGUAGE DETECTION

(71) Applicant: International Business Machines Corporation, Armonk, NY (US)

(72) Inventors: Aaron K. Baughman, Silver Spring, MD (US); Stephen C. Hammer, Marietta, GA (US); Mauro Marzorati, Lutz, FL (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 15/605,984

(22) Filed: May 26, 2017

(65) Prior Publication Data
US 2018/0342239 A1  Nov. 29, 2018

(51) Int. Cl.
*G10L 15/183* (2013.01)
*G10L 15/06* (2013.01)
*G10L 15/00* (2013.01)

(52) U.S. Cl.
CPC .......... *G10L 15/183* (2013.01); *G10L 15/005* (2013.01); *G10L 15/063* (2013.01)

(58) Field of Classification Search
CPC . G10L 15/183; G10L 15/1815; G10L 15/063; G10L 25/51; G10L 15/005; G10L 2015/0635
USPC .......................................................... 704/235
See application file for complete search history.

(56) References Cited

U.S. PATENT DOCUMENTS

| | | | |
|---|---|---|---|
| 6,009,392 A * | 12/1999 | Kanevsky | G10L 15/063 704/240 |
| 7,369,998 B2 * | 5/2008 | Sarich | G06F 40/58 704/277 |
| 7,941,317 B1 * | 5/2011 | Goffin | G10L 15/02 704/256.7 |
| 7,957,969 B2 * | 6/2011 | Alewine | G10L 13/08 704/254 |
| 8,249,854 B2 * | 8/2012 | Nikitin | G06F 40/58 704/2 |
| 8,504,351 B2 | 8/2013 | Waibel et al. | |
| 8,583,416 B2 * | 11/2013 | Huang | G10L 15/1822 704/3 |

(Continued)

FOREIGN PATENT DOCUMENTS

EP        0570660 A1    11/1993

OTHER PUBLICATIONS

Baughman et al., "Closed Captioning Through Language Detection", U.S. Appl. No. 16/387,942, filed Apr. 18, 2019, 37 pages.

(Continued)

*Primary Examiner* — Edwin S Leland, III

(74) *Attorney, Agent, or Firm* — Stephen R. Yoder

(57) ABSTRACT

In an approach for acoustic modeling with a language model, a computer isolates an audio stream. The computer identifies one or more language models based at least in part on the isolated audio stream. The computer selects a language model from the identified one or more language models. The computer creates a text based on the selected language model and the isolated audio stream. The computer creates an acoustic model based on the created text. The computer generates a confidence level associated with the created acoustic model. The computer selects a highest ranked language model based at least in part on the generated confidence level.

20 Claims, 3 Drawing Sheets

(56) References Cited

U.S. PATENT DOCUMENTS

| | | | | |
|---|---|---|---|---|
| 8,583,432 | B1* | 11/2013 | Biadsy | G10L 15/18 704/235 |
| 8,775,174 | B2 | 7/2014 | Conejero et al. | |
| 8,965,763 | B1* | 2/2015 | Chelba | G10L 15/063 704/244 |
| 9,153,231 | B1* | 10/2015 | Salvador | G10L 15/065 |
| 9,342,504 | B2* | 5/2016 | Ehsani | G10L 15/22 |
| 9,436,759 | B2* | 9/2016 | Huang | G06F 16/36 |
| 9,892,733 | B2* | 2/2018 | Yassa | G10L 15/183 |
| 2002/0143525 | A1* | 10/2002 | Lewis | G10L 15/26 704/201 |
| 2003/0182121 | A1* | 9/2003 | Hwang | G10L 15/065 704/251 |
| 2005/0182628 | A1* | 8/2005 | Choi | G10L 15/08 704/252 |
| 2006/0116877 | A1* | 6/2006 | Pickering | G10L 15/08 704/231 |
| 2006/0149558 | A1* | 7/2006 | Kahn | G10L 15/18 704/278 |
| 2006/0285654 | A1* | 12/2006 | Nesvadba | H04N 21/440236 379/67.1 |
| 2009/0271195 | A1* | 10/2009 | Kitade | G10L 15/18 704/239 |
| 2011/0320197 | A1* | 12/2011 | Conejero | G06F 16/685 704/235 |
| 2012/0053935 | A1* | 3/2012 | Malegaonkar | H04M 3/42221 704/235 |
| 2012/0078608 | A1* | 3/2012 | Waibel | G06F 40/58 704/2 |
| 2012/0143605 | A1* | 6/2012 | Thorsen | G10L 15/183 704/235 |
| 2012/0150532 | A1* | 6/2012 | Mirowski | G06F 40/40 704/9 |
| 2015/0154953 | A1* | 6/2015 | Bapat | G10L 15/06 704/251 |
| 2015/0364129 | A1* | 12/2015 | Gonzalez-Dominguez | G10L 15/005 704/251 |
| 2016/0253989 | A1* | 9/2016 | Kuo | G10L 15/183 704/257 |
| 2016/0336006 | A1* | 11/2016 | Levit | G10L 15/10 |
| 2016/0365093 | A1* | 12/2016 | Nissan | G10L 15/187 |
| 2017/0213551 | A1* | 7/2017 | Ji | B60W 50/10 |
| 2018/0061439 | A1* | 3/2018 | Diamos | G10L 15/063 |
| 2018/0342239 | A1* | 11/2018 | Baughman | G10L 15/005 |

OTHER PUBLICATIONS

IBM Appendix P, list of patents and patent applications treated as related, Filed Herewith, 2 pages.

Appendix P, List of IBM Patents or Patent Applications Treated as Related, 2 pages, dated Jan. 31, 2018.

Baughman et al., "Closed Captioning Through Language Detection", U.S. Appl. No. 15/839,082, filed Dec. 12, 2017, 36 pages.

Model et al., "A General Framework for Extension of a Tracking Range of User-Calibration-Free Remote Eye-Gaze Tracking Systems", Copyright © 2012 by the Association for Computing Machinery, Inc., ETRA 2012, Santa Barbara, CA, Mar. 28-30, 2012, © 2012 ACM, 4 pages.

Model et al., "A probabilistic approach for the estimation of angle kappa in infants", Copyright © 2012 by the Association for Computing Machinery, Inc., ETRA 2012, Santa Barbara, CA, Mar. 28-30, 2012, © 2012 ACM, 6 pages.

Model et al., "User-Calibration-Free Remote Gaze Estimation System", Copyright © 2010 by the Association for Computing Machinery. Inc., ETRA 2010, Austin, TX, Mar. 22-24, 2010, © 2010 ACM, 8 pages.

Wang et al., "Comparison of Acoustic Model Adaptation Techniques on Non-Native Speech", © 2003 IEEE, ICASSP 2003, 4 pages.

"Apache License", The APACHE® Software Foundation, Version 2.0, Jan. 2004, <http://www.apache.org/licenses/LICENSE-2.0>, 4 pages.

IBM, "Watson Speech to Text", Australian Open, Jan. 16, 2017, Printed May 24, 2017, 1 page, <http://www.usopen.org/demos/speech_to_text/index.html>, Grace Period Disclosure.

* cited by examiner

CLOSED CAPTIONING THROUGH LANGUAGE DETECTION

Various aspects of the present invention have been made publicly available on Jan. 16, 2017 at the Australian Open 2017. The following disclosure(s) are submitted under 35 U.S.C. 102(b)(1)(A) as prior disclosures by, or on behalf of, a sole inventor of the present application or a joint inventor of the present application.

(i) Participants attending Australian Open 2017 viewed demonstrations and a dashboard that utilized language models to perform speech to text from HTTP Live Streaming.

BACKGROUND

The present invention relates generally to the field of speech recognition, and more particularly to automatic detection of a language to create closed captioning.

Speech recognition (SR), automatic speech recognition (ASR), or speech to text (STT) enables the recognition and translation of spoken language into text by computers through computational linguistics methodologies and technologies (e.g., pattern matching, pattern and feature analysis, language modeling and statistical analysis, artificial neural networks, etc.). While speaking, an individual generates a voice by producing sound packets known as phones. Phones are distinct speech sounds in phonetics or linguistics that correspond to the sound of letters or groups of letters in a word that are represented by phonemes. Phonemes are units (e.g., groups) of sound or sound variants that create one sound, which distinguishes one word from another in a particular language. In other words, while phones are actual bits of sound that occur when an individual speaks that possess a distinct physical or perceptual property, the phoneme is an indivisible unit of sound that is an abstraction of the physical speech sounds of phones, which may encompass several different sounds (i.e., an ideal bit of sound that is not spoken). Through speech recognition, computers match the sounds created by phones and phonemes for words with word sequences, and utilize a language model to provide the context, thereby allowing the computers to distinguish between words and phrases that sound similar.

Closed captioning (CC) is a form of subtitling, in which a transcript of a screen play or the dialog of a commentary are displayed as text on a television, video screen, or other visual display. The closed captioning text transcribes the audio portion of a program as a broadcast (e.g., television program, commercial, trailer, etc.) occurs. From the closed captioning, a viewer is able to access additional interpretive information that describes the speech, non-speech elements, and/or an alternative language translation.

SUMMARY

Aspects of the present invention disclose a method, computer program product, and system for acoustic modeling with a language model the method comprises one or more computer processors isolating an audio stream. The method further comprises one or more computer processors identifying one or more language models based at least in part on the isolated audio stream. The method further comprises one or more computer processors selecting a language model from the identified one or more language models. The method further comprises one or more computer processors creating a text based on the selected language model and the isolated audio stream. The method further comprises one or more computer processors creating an acoustic model based on the created text. The method further comprises one or more computer processors generating a confidence level associated with the created acoustic model. The method further comprises one or more computer processors selecting a highest ranked language model based at least in part on the generated first confidence level.

DETAILED DESCRIPTION

Embodiments of the present invention recognize that speech recognition is a complex interdisciplinary field of computer science that involves complex linguistics, mathematics, and computing. Embodiments of the present invention recognize that speech is variable, as individuals speak differently even when speaking the same words built from a standard set of phonemes. Embodiments of the present invention also recognize that the manner in which individuals speak and pronounce words depends upon geographic location and whether the language spoken is the native language of the speaker. Additionally, embodiments of the present invention recognize that the accuracy of closed captioning text depends upon the proficiency of the user speaking and the selection of an appropriate language model when performing speech recognition. Embodiments of the present invention match sounds heard within an audio stream of a streaming video to a language, by matching the heard sound to known phonetic patterns of language models in order to reduce the number of possible language models to a smaller targeted subset. Embodiments of the present invention create closed captioning for the audio stream utilizing a selected language model from the subset. Embodiments of the present invention improve the accuracy of the closed captioning displayed with the streaming video by determining confidence levels associated with the selected language model, performing additional online learning, and in some embodiments selecting another language model.

Figure 1:
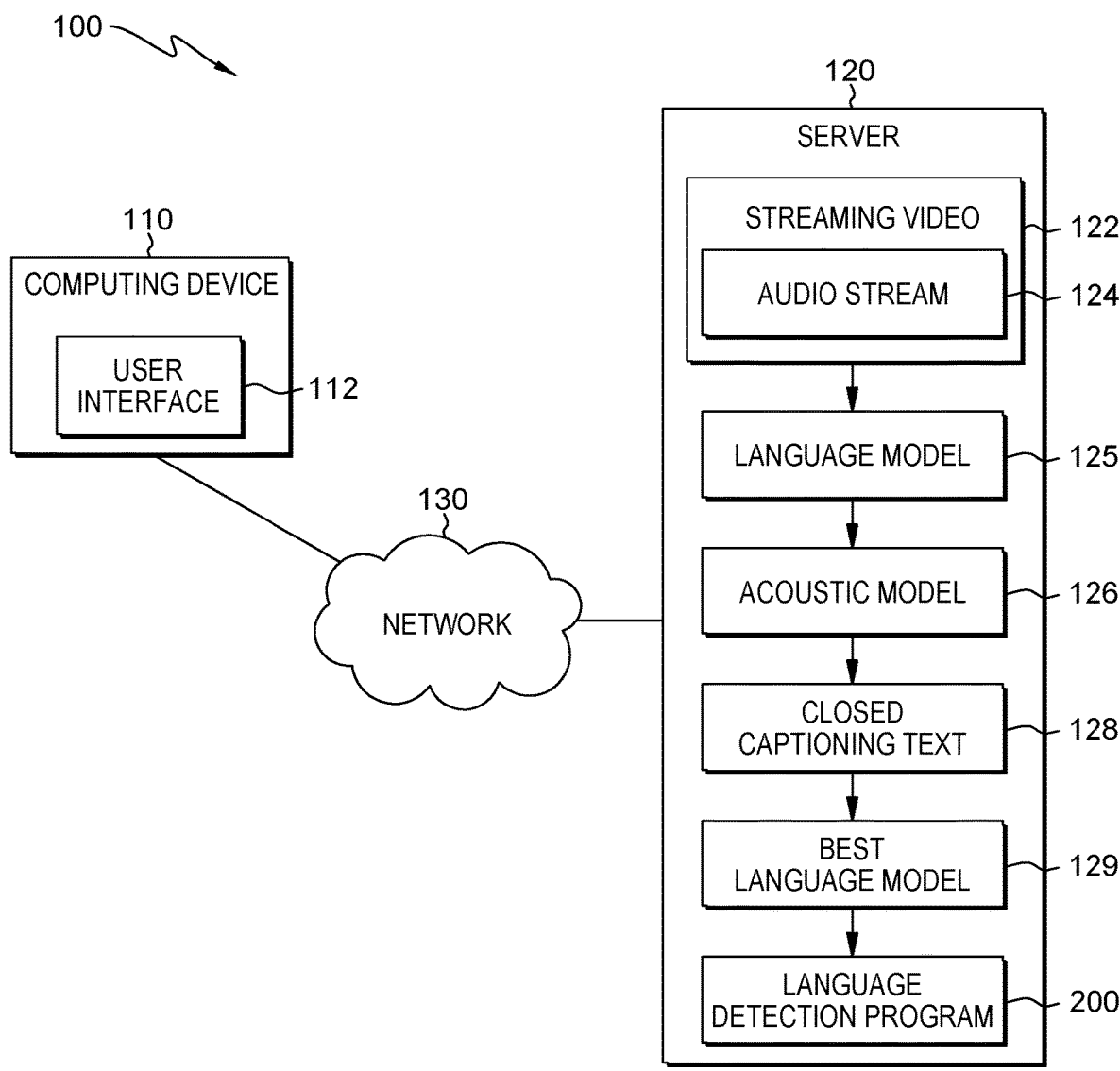
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one embodiment and does not imply any limitations with regard to the environments in which different embodiments may be implemented.

In the depicted embodiment, distributed data processing environment 100 includes computing device 110 and server 120 interconnected over network 130. Distributed data processing environment 100 may include additional computing devices, mobile computing devices, servers, computers, storage devices, or other devices not shown.

Computing device 110 may be a web server or any other electronic device or computing system capable of processing program instructions and receiving and sending data. In some embodiments, computing device 110 may be a laptop computer, a tablet computer, a netbook computer, a personal computer (PC), a desktop computer, a personal digital assistant (PDA), a smart phone, or any programmable electronic device capable of communicating with network 130. In other embodiments, computing device 110 may represent a server computing system utilizing multiple computers as a server system, such as in a cloud computing environment. In general, computing device 110 is representative of any electronic device or combination of electronic devices capable of executing machine readable program instructions as described in greater detail with regard to FIG. 3, in accordance with embodiments of the present invention. Computing device 110 contains user interface 112.

User interface 112 is a program that provides an interface between a user of computing device 110 and a plurality of applications that reside on computing device 110 and/or may be accessed over network 130 (e.g., accesses and initiates language detection program 200 on server 120). A user interface, such as user interface 112, refers to the information (e.g., graphic, text, sound) that a program presents to a user and the control sequences the user employs to control the program. A variety of types of user interfaces exist. In one embodiment, user interface 112 is a graphical user interface. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interface 112 sends and receives information to language detection program 200.

Server 120 may be a management server, a web server, or any other electronic device or computing system capable of receiving and sending data. In some embodiments, server 120 may be a laptop computer, a tablet computer, a netbook computer, a personal computer (PC), a desktop computer, a personal digital assistant (PDA), a smart phone, or any programmable device capable of communication with computing device 110 over network 130. In other embodiments, server 120 may represent a server computing system utilizing multiple computers as a server system, such as in a cloud computing environment. Server 120 contains streaming video 122, language model 125, acoustic model 126, closed captioning text 128, best language model 129, and language detection program 200.

Streaming video 122 is live streaming multimedia delivered by a provider in real-time for viewing by an individual, as an event happens (e.g., a live television broadcast). For example, newscasts, sports programs, awards shows, etc. air as the event takes place as opposed to a program that is rehearsed, filmed, and edited prior to broadcasting. Streaming video 122 includes video data in a video coding format (i.e., a content representation format for storage or transmission of digital video content, such as in a data file or bit stream) and audio data (e.g., audio stream 124) in an audio coding format (i.e., a content representation format for storage or transmission of digital audio, such as in digital television, digital radio and in audio and video files) within a multimedia container. The multimedia container is a metafile format that describes how different elements of data and metadata coexist by identifying and interleaving different data types. In one embodiment, streaming video 122 includes a simple container format that can contain different types of audio formats and the video stream. In another embodiment, streaming video 122 includes a more advanced container format that supports multiple audio and video streams, subtitles, chapter-information, closed captioning, and meta-data, along with synchronization information for playing back the various streams together. In the depicted embodiment, streaming video 122 resides on server 120. In another embodiment, streaming video 122 resides on computing device 110. In some other embodiment, streaming video 122 resides on additional computing devices, mobile computing devices, servers, computers, storage devices, or other devices not shown. Streaming video 122 includes audio stream 124.

Audio stream 124 is the sound component of streaming video 122, which accompanies the video data for streaming video 122. Audio stream 124 includes words spoken by a speaker, music, noises, etc. that are capable of being heard by an individual. As audio stream 124 occurs, a codec applies an audio coding format (e.g., audio compression format) is applied to audio stream 124 to allow for storage or transmission of digital audio. The encoded audio content of audio stream 124 is bundled with the video data inside a multimedia container format. Upon receipt of the multimedia container format at a computing device (e.g., server 120, computing device 110) a codec decodes streaming video 122 with audio stream 124 for viewing.

Language model 125 is a file that include a list of words and a probability of occurrence, which aids in the recognition of speech. Language model 125 defines possible sequences of words and associated probability distributions in a language (i.e., probability distributions for a string of words, which attempts to reflect how frequently a string of words occurs within a sentence). In addition, language model 125 provides context to distinguish between words and phrases that sound similar. While language model 125 is depicted as a singular instance, multiple instances of language model 125 are available that include multiple variations to account for different dialects or forms of a language (e.g., American English versus British English) as well as multiple languages (e.g., English, Spanish, French, etc.). Throughout language detection program 200, in some embodiments, instances of language model 125 are updated (modified, added to, etc.) by incorporating online learning with respect to the analysis of audio stream 124 and closed captioning text 128. In the depicted embodiment, language model 125 resides on server 120. In another embodiment, language model 125 resides on computing device 110. In some other embodiment, language model 125 resides on additional computing devices, mobile computing devices, servers, computers, storage devices, or other devices not shown provided language model 125 is accessible by language detection program 200.

Acoustic model 126 is an audio output created by language detection program 200 as a synthesized speech file (e.g., waveform audio file format (WAV)). Acoustic model 126 defines a relationship between an audio signal and the phonemes (e.g., phonetic units) in a language to create speech. Language detection program 200 creates acoustic model 126 by creating closed captioning text 128 for audio stream 124 utilizing a selected instance of language model 125. Language detection program 200 converts closed captioning text 128 into acoustic model 126 (i.e., transforms text back into sounds to recreate speech). In the depicted embodiment, acoustic model 126 resides on server 120.

Closed captioning text 128 is a text output created by language detection program 200 that identifies and provides text which accompanies streaming video 122 based upon audio stream 124. Language detection program 200 creates closed captioning text 128 based on audio stream 124 and a selected instance of language model 125. In the depicted embodiment, closed captioning text 128 resides on server 120.

Best language model 129 is an instance of language model 125 with a highest confidence level (e.g., highest ranked). For example, language detection program 200 calculates a confidence level utilizing language model 125 (discussed in further detail with respect to FIG. 2, step 216). Language detection program 200 compares the calculated confidence level with proficiency definitions and/or previous calculations of confidence levels associated with a prior instance of language model 125 (e.g., stored confidence level of best language model 129). In one embodiment, the confidence level is equal to or greater than a specified proficiency value that defines a minimum confidence level, and language detection program 200 sets the current instance of language model 125 as best language model 129. In another embodiment, language detection program 200 compares the confidence level of the current instance of language model 125 with the confidence level of best language model 129. If the confidence level of the current instance of language model 125 is higher than the confidence level of best language model 129, then language detection program 200 replaces best language model 129 with the current instance of language model 125. In the depicted embodiment, best language model 129 resides on server 120.

Network 130 may be a local area network (LAN), a wide area network (WAN) such as the Internet, a wireless local area network (WLAN), any combination thereof, or any combination of connections and protocols that will support communications between computing device 110, server 120, and other computing devices and servers (not shown), in accordance with embodiments of the inventions. Network 130 may include wired, wireless, or fiber optic connections.

Language detection program 200 is a program for creating closed captioning text 128 to accompany streaming video 122 with improved proficiency. Language detection program 200 creates closed captioning text 128 from audio stream 124 with an instance of language model 125. Language detection program 200 converts closed captioning text 128 into acoustic model 126 for comparison to audio stream 124 (e.g., determines proficiency and/or the likelihood of language model 125 matching the native language of the speaker). Language detection program determines a confidence level based upon the comparison, and through online learning updates language model 125 for further utilization. Language detection program selects addition instances of language model 125 and/or updates the selected instance of language model 125 through online learning to improve proficiency as additional iterations of language detection program 200 occur during streaming video 122. In some embodiments, language detection program 200 includes capabilities that perform video conversion, speech to text, and text to speech conversions. In the depicted embodiment, language detection program 200 resides on server 120. In another embodiment, language detection program 200 resides on computing device 110. In some other embodiment, language detection program 200 resides on additional computing devices, mobile computing devices, servers, computers, storage devices, or other devices not shown provided language model 125 and streaming video 122 are accessible by language detection program 200.

Figure 2:
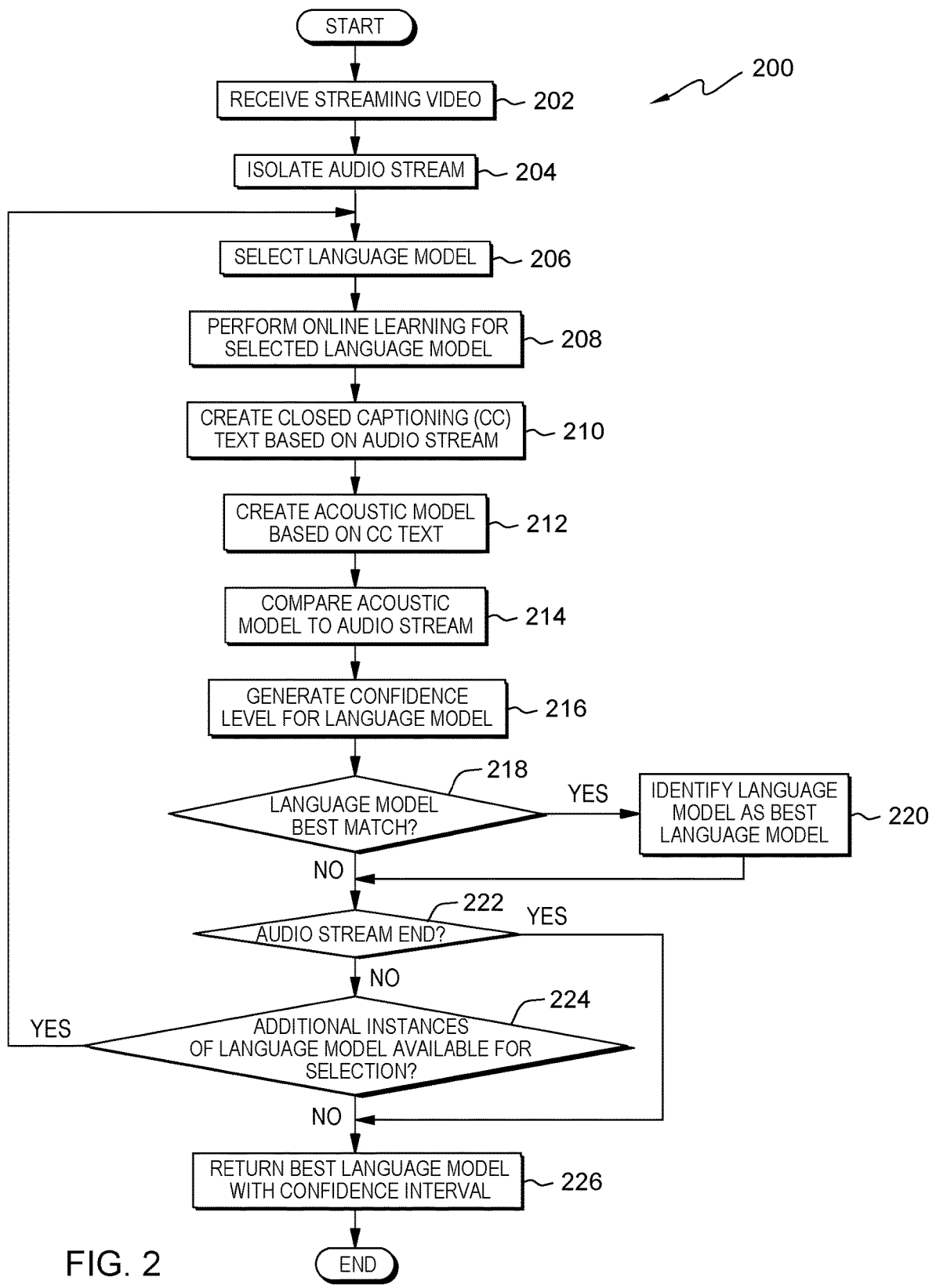
FIG. 2 is a flowchart depicting operational steps of a language detection program, on a server within the distributed data processing environment of FIG. 1, for automatically detecting a language associated with speech of a streaming video, and generating corresponding closed captioning for display with the streaming video that improves proficiency, in accordance with an embodiment of the present invention.

FIG. 2 is a flowchart depicting operational steps of language detection program 200, a program for automatically detecting a language associated with speech (e.g., audio stream 124) of streaming video 122, and generating corresponding closed captioning text 128 for display with streaming video 122 with improving proficiency, in accordance with an embodiment of the present invention. In one embodiment, language detection program 200 is running as a background program (e.g., service) on server 120 that initiates upon receipt of streaming video 122. In another embodiment, language detection program 200 initiates upon user request through user interface 112, which includes an identified instance of streaming video 122.

In step 202, language detection program 200 receives streaming video 122. In one embodiment, language detection program 200 automatically receives streaming video 122 once the streaming of streaming video 122 initiates at the start of streaming video 122 (e.g., background service). In another embodiment, language detection program 200 receives streaming video 122, however language detection program 200 initiates in response to detecting speech is occurring (e.g., waits to continue processing until language detection program 200 detects spoken words). In another embodiment, language detection program 200 receives an indication of a start to a streaming event for streaming video 122, from a user via user interface 112, and language detection program 200 initiates.

In step 204, language detection program 200 isolates audio stream 124. Language detection program 200 identifies sounds (e.g., recorded or live human audio) associated with spoken language within streaming video 122 as audio stream 124. In one embodiment, streaming video 122 includes video data and audio stream 124. In another embodiment, streaming video 122 includes video data, audio stream 124, and closed captioning. Language detection program 200 utilizes a video converter utility to extract audio stream 124 from streaming video 122. Language detection program 200 identifies the container that describes elements of data and metadata within streaming video 122 and associated codecs. Codecs encode streaming video 122 for transmission and storage, and decode streaming video 122 for playback and/or editing on computing device 110. An audio codec encodes audio stream 124, whereas a video codec encodes the video data of streaming video 122. Language detection program 200 identifies the audio codec associated with the container type of streaming video 122. Language detection program 200 isolates and extracts audio stream 124 for the identified audio codec. Language detection program 200 stores audio stream 124 separately in an audio format (e.g., Moving Picture Experts Group (MPEG) Audio Layer III (MP3), Pulse-code modulation (PCM), Waveform Audio File Format (WAV), MPEG-4 Part (MP4), etc.) for further use.

In step 206, language detection program 200 selects language model 125. Language detection program 200 selects a targeted instance of language model 125 based on identifying the language of the speaker (e.g., selects from a plurality of instances of language model 125). In one embodiment, language detection program 200 selects language model 125 based on existing closed captioning included in streaming video 122 (e.g., closed captioning format is in French, therefore the target native language is French). For example, streaming video 122 includes a closed captioning file within the container that stores streaming video 122. Language detection program 200 extracts the closed captioning file in addition to audio stream 124 within step 204. Language detection program 200 identifies a general language (e.g., identifies language based on the included closed captioning file. Language detection program 200 selects a domain content of the closed captioning text (i.e., subject of discussion). Language detection program 200 compares the words within the closed captioning file with a stream of words within instances of language model 125. Language detection program 200 selects an instance of language model 125 that includes a highest match of similar words between the closed captioning file and the stream of words within an instance of language model 125 for further analysis. In another embodiment, language detection program 200 selects language model 125 based on information within the metadata (e.g., provides data about the data within streaming video 122). For example, the metadata of streaming video 122 identifies an instance of language model 125 for utilization.

In some other embodiment, language detection program 200 selects language model 125 based on audio stream 124 with an allowed latency. The allowed latency is a delay between the time an audio signal, such as audio stream 124, enters a system, and the time audio stream 124 emerges from the system. For example in a live broadcast, a short delay referred to as a seven-second delay or profanity delay is often used to prevent profanity, violence, or other undesirable material from being broadcast and/or to account for technical malfunctions (i.e. a microphone goes dead), and also allows for closed captioning to be added. In one embodiment, language detection program 200 receives an allowed latency that is set by the source which provides streaming video 122. For example, the user and/or network responsible for broadcasting streaming video 122 sets a broadcast delay of seven seconds. In another embodiment, language detection program 200 sets a simple latency (e.g., seven seconds, five seconds, etc.) as a minimum latency delay (i.e., a minimum amount of time to analyze audio stream 124 and select an instance of language model 125).

Language detection program 200 acquires a sample of audio stream 124 within the time specified by the allowed latency. Language detection program 200 analyzes the sample of audio stream 124 and identifies a base language (e.g., English, Italian, Russian, Chinese, etc.). Language detection program 200 identifies instances of language model 125 that match the base language (i.e., identifies instances of language model 125 that are created from the same base language, but in addition to the average base language also includes domain specific instances of language model 125 that cover specific subjects). For example, the base language is English, however, within the base language of English, multiple separate domains (e.g., subjects) exist that cover medicine, cooking, sports, music, education, animals, news, etc. Language detection program 200 compares the words within audio stream 124 with the stream of words within the identified instances of language model 125. Language detection program 200 selects the instance of language model 125 that includes the highest number of matches with the words within the sample of audio stream 124, thereby identifying an instance of language model 125 that includes a higher confidence level and higher probability of matching future spoken words within audio stream 124 (i.e., identifies a more specific sub-level within the overall primary base language that targets a more domain specific instance of language model 125).

In yet another embodiment, language detection program 200 selects language model 125 for audio stream 124 without an allowed latency (e.g., streaming video 122 and/or audio stream 124 are broadcast in real time without a delay) and/or with a latency delay that is less than the minimum latency delay (i.e., delay is not long enough to allow language detection program 200 to acquire and analyze a full sample of audio stream 124). Language detection program 200 collects samples of audio stream 124 based on a sampling rate. The sample rate identifies a time period (e.g., one second, small imperceptible unit of time in which the perceived delay is negligible) over which language detection program 200 collects samples of audio stream 124 for analysis. Language detection program 200 analyzes the sample of audio stream 124 to identify the base language (e.g., identifies broad base language). Language detection program 200 identifies one or more instances of language model 125 that are associated with the base language (i.e., identifies sub-levels or domains within the base language that represent specific topic areas). In one embodiment, language detection program 200 selects an average instance of language model 125 for the identified base language.

For example, on average an individual speaks two hundred and twenty five words per minute. Within one second, the individual speaks approximately three to four words. As instances of language model 125 share common words (e.g., the, of, to, a, an, and, is, it, you, etc.), language detection program 200 identifies multiple instance of language model 125 that contain the same number of matching words (e.g., unable to identify unique subject within the three to four spoken words). Therefore, initially language detection program 200 is unable to distinguish between instances of language model 125. Language detection program 200 selects an average instance of language model 125, which encompasses the most common spoken words and phrases in the base language and broadest subject, until additional iterations of language detection program 200 occur.

In another embodiment, language detection program 200 selects language model 125 through a non-exhaustive process (e.g., most popular to date, most recently used, category associated with streaming video 122, etc.). In some other embodiment, language detection program 200 selects language model 125 as a combination of the non-exhaustive processes and an initial sample (e.g., data acquired through sample rate, data collected through allowed latency, etc.) to select language model 125. For example, in audio stream 124, a speaker says "This evening there was" within the one second sample. Language detection program 200 is unable to identify a specific subject within the four spoken words and identifies the instances of language model 125 that include "this", "evening", "there", and "was". However, language detection program 200 determines the most recently used instance on language model 125 includes the four spoken words. Language detection program 200 determines a degree of similarity exists between the one second sample and the most recently used instance of language model 125, and language detection program 200 selects the most recently used instance of language model 125 for initial analysis. In other words, language detection program 200 infers the current instance of audio stream 124, which follows a prior instance of audio stream 124 and includes similar words, are related and share a common subject. Therefore, language detection program 200 utilizes the most recently used instance of language model 125 for the current instance of audio stream 124.

In some embodiments, language detection program 200 selects an additional instance of language model 125 after determining additional instances of language model 125 are available for selection (decision 224, yes branch). Language detection program 200 repeats one of the aforementioned embodiments to identify one or more instances of language model 125 for selection. Language detection program 200 improves the accuracy and/or proficiency through subsequent iterations of language detection program 200 as the domains of language model 125 grow with the addition of new words through online learning, and/or by selecting a more specific instance of language model 125 (e.g., identifies a different instance of language model 125 that includes a higher number of matching words.) In one embodiment, language detection program 200 utilizes the generated confidence level (step 216) to assist in selection of an instance of language model 125. Language detection program 200 confirms or refutes the selection of language model 125 (i.e., confirms selection was correct or determines the selection was incorrect.) For example, the confidence level of the first selected instance of language model 125 is fifty percent. In the second iteration of language detection program 200, language detection program 200 through the aforementioned embodiments selects an updated instance of the original selected instance of language model 125 (i.e., language model 125 includes online learning from step 208, which adds spoken words to language model 125 from the first iteration, thereby growing the domain) for the second selected instance of language model 125. At step 216, language detection program 200 calculates a confidence level of sixty percent associated with language model 125. In a third iteration of language detection program 200, as the confidence level of language model 125 increases with each subsequent iteration, language detection program 200 continues to select the updated instance of the originally selected instance of language model 125 (e.g., includes online learning from the first and second iterations).

Conversely in the second iteration, the confidence level of language model 125 decreases from fifty percent to forty percent. Language detection program 200 identifies the decrease in confidence level, and determines the originally selected instance of language model 125 may not be correct. Therefore, in the third iteration of language detection program 200, language detection program 200 selects a different instance of language model 125 than previously selected. However, if language detection program 200 determines the confidence level of the third iteration again decreases, then language detection program 200 may select another instance of language model 125 or language detection program 200 reselects the originally selected instance of language model 125 associated with the higher confidence level.

In step 208, language detection program 200 performs online learning for the selected instance of language model 125. Online leaning includes machine learning and data mining techniques. Machine learning provides the ability to learn through artificial intelligence through pattern recognition and computational learning theory in instances in which a computer or program such as language detection program 200 without being explicitly programmed. Data mining sorts through large data sets to identify pattern and establish relationships to solve problems through data analysis. In one embodiment, language detection program 200 incorporates a neural network. A neural network is a system of programs and data patterned on the operation of the human brain that learns from and adapts to initial rules and experiences. Initial training of the neural network includes providing input and identifying the expected output based on the input. After initial training, the neural network learns by gradually adjusting the strength of connections between the layers. Language detection program 200 utilizes the trained neural network to update the selected instance of language model 125. For example, an individual while speaking (i.e., produces audio stream 124) combines words that are found within language model 125 in a manner that is different from previously spoken and stored phrases within language model 125. Language detection program 200 adds the additional newly spoken words and strengthens connections between the words of the newly identified phrases for future utilization within language model 125.

In another embodiment, language detection program 200 adds the identified spoken words within audio stream 124 to the selected instance of language model 125, thereby increasing the number of recognized words and association within the selected instance of language model 125 (e.g. grows the domain, topic, etc.). For example, streaming video 122 is broadcasting a tennis match. Initial samples of audio stream 124 include discussions of tennis with tennis terms such as "The current score is forty love in the second set." However, the tennis match is taking place during breakfast at a tournament. The announcer begins speaking about the time honored brunch that is served during the event, stating "Strawberries are a quintessential ingredient aside from tennis and tennis players that must be present during the event. Each table is set with a crystal bowl filled with strawberries adorned by smaller bowls that include granulated sugar, whipped cream, and heavy cream for the spectators to enjoy while watching the tennis match." While the primary content of the first sample of audio stream 124 relates to tennis and tennis terms (e.g., related words), the second sample of audio stream 124 diverges and includes content related to food (e.g., unrelated words, second topic) and tennis (e.g., related words, first topic). Language detection program 200 adds the additional words (e.g., food related terms) to the selected instance of language model 125 so that language model 125 covers the content of both samples (i.e., expands the topic covered within the domain to be sports and food related).

In step 210, language detection program 200 creates closed captioning text 128 based on audio stream 124 with the selected instance of language model 125. Language detection program 200 converts audio stream 124 though a speech to text conversion. Language detection program 200 breaks audio stream 124 into short samples (e.g., hundredths of a second, thousandths of a second). Language detection program 200 associates the short samples to phonemes (i.e., units of pronunciation) within language model 125. Language detection program 200 examines the phonemes with respect to the adjacent and/or surrounding phonemes and creates a contextual plot. The contextual plot maps the manner in which the phonemes combine (e.g., precede, depend, follow, etc.) to create spoken words. Language detection program 200 applies statistical models to the contextual plot to create possible words. Language detection program 200 compares the created possible words to a library of know words, phrases, and sentences for the selected instance of language model 125. Language detection program 200 identifies spoken words based on the comparison, which matches the possible words with actual words with the highest probability. Additionally language detection program 200 selects words based on the overall combination of the identified spoken words which create a phrase and/or a sentence by analyzing sentence structure and syntax of the identified spoken words with respect to the proceeding and following spoken word. Language detection program 200 creates closed captioning text 128 from the identified spoken words. As subsequent iterations of language detection program 200 occur, as the domain of language model 125 increases and language detection program selects a more specific instance of language model 125 (e.g., identifies a sub level within the base language that matches audio stream 124), the accuracy and proficiency of closed captioning text 128 improves (e.g., provides a more accurate translation of the words spoken by the speaker within closed captioning text 128).

In step 212, language detection program 200 creates acoustic model 126 based on closed captioning text 128. Language detection program 200 converts closed captioning text 128 to acoustic model 126 though text to speech utilities. Language detection program 200 performs text analysis on closed captioning text 128. Language detection program 200 breaks closed captioning text into individual words. Language detection program 200 assigns phonemes that visually represent the speech sounds of the individual word. Language detection program 200 groups the phonemes into syllables and/or larger units of speech (e.g., not individual phonetic segments associated with a single vowel and/or consonant). Language detection program 200 applies components of linguistic analysis (e.g., phasing, intonation, and duration) to the syllables of the individual words to form an utterance of the composed phonemes (i.e., vocal expression that recreates speech). Language detection program 200 combines the utterances of the individual words and creates acoustic model 126 (e.g., synthesized speech stored as a digital wave file).

In step 214, language detection program 200 compares acoustic model 126 to audio stream 124 (e.g., compares the original wave file to the synthesized wave file). In one embodiment, language detection program 200 compares acoustic model 126 to audio stream 124 utilizing Fast Fourier Transform (FFT). A Fourier analysis converts a signal from its original domain to a representation in the frequency domain and extracts features from acoustic model 126 and audio stream 124 for correlation and comparison (e.g., compares acoustic model 126 which is synthesized to the original, unmodified data provided by audio stream 124.) Language detection program 200 splits acoustic model 126 and audio stream 124 into individual segments (e.g., one second long samples.) Language detection program 200 calculates the FFT for each individual segment for acoustic model 126 and audio stream 124. Language detection program 200 calculates a correlation between the FFT for acoustic model 126 and the FFT for audio stream 124. Language detection program 200 utilizes the calculated correlation to determine a confidence level.

In another embodiment, language detection program 200 determines a probability that words of audio stream 124 are correctly converted to closed captioning text 128 as:

$$P(\text{words} \mid \text{signal}) = \frac{P(\text{words}) * P(\text{signal} \mid \text{words})}{P(\text{signal})}$$

P(words) represents the probability that the selected instance of language model 125 defines the probability that a specified word is followed by a related word. For example, an individual says the initial words "I am", and language model 125 defines the probabilities that the word following "am" is the word "fine" or the word "hot." P(signal|words) represents a probability associated with acoustic model 126 that identifies the probability that acoustic model 126 is correct when speaking the identified words (e.g., probability that the translation is correct). P(signal|words) for acoustic model 126 is further broken down as the P(phones|words) *P(signal|phones). P(phones|words) is the probability of pronouncing a specific word in the correct (e.g., anticipated) manner. For example when pronouncing the word tomato two different pronunciations may occur. In one instance tomato is pronounced with a long "a" sound (e.g. long vowel). In a second instance tomato is pronounced with a short "a" sound (e.g., short vowel). While the word and meaning of tomato are the same in both instances, the two instances pronounce tomato differently. P(signal|phones) is the probability of a signal with a given phone occurring (i.e., probability that the signal is the sound an individual is most likely making). P(signal) is the probability of audio stream 124. Language detection program 200 calculates the probabilities for the individual pieces, and calculates the overall probability to compare acoustic model 126 to audio stream 124 (e.g., high probability indicates a high degree of matching or that the translations are correct, and a low probability indicates a lower degree of matching or the translations are incorrect).

In some other embodiment, language detection program 200 calculates a word error rate (WER). The word error rate is defined as:

$$WER = \frac{100 * (SUB + INS + DEL)}{\text{total number of words in } refernce\ transcipt}$$

Language detection program 200 identifies the number of substitutions (SUB), insertions (INS), and deletions (DEL) in acoustic model 126 (e.g., hypothesis data). Language detection program 200 identifies SUB, INS, and DEL as letters and/or words within acoustic model 126. Language detection program 200 determines the total number of words in audio stream 124 (e.g., truth data). Language detection program 200 calculates WER as a percentage based on the ratio of acoustic model 126 to audio stream 124 (e.g., ratio of hypothesis data to truth data). Language detection program 200 determines a level of proficiency based upon the WER. In subsequent iterations, language detection program 200 attempts to minimize the WER as online learning improves language model 125 and/or as language detection program 200 selects an instance of language model 125 that is more closely related to audio stream 124.

In yet another embodiment, language detection program 200 calculate a semantic error rate (SER). The semantic error rate is defined as:

$$SER = \frac{100 * POS\Delta + Pred\Delta + \text{Relationship } \Delta}{|POS\Delta| + |Pred\Delta| + |\text{Relationship}\Delta|}$$

The semantic error rate identifies and counts the parts of speech that are different with respect to the total number of words within the sentence. Language detection program 200 identifies the parts of speech within acoustic model 126 that represent the subject (POSH), the predicate (PredΔ), and anaphors (RelationshipΔ). Language detection program 200 identifies the parts of speech within audio stream 124 that represent the subject (|POSΔ|), the predicate (|PredΔ|), and anaphors (|RelationshipΔ|). POSΔ and |POSΔ| encompasses the nouns and objects that form the subject portion of a sentence. PredΔ and |PredΔ| encompasses the verbs or action part of the sentence. RelathionshipΔ and |RelathionshipΔ| encompasses the anaphor, which is the use of an expression in which the interpretation depends upon another expression in context such as an antecedent or postcedent. For example, in the sentence "Leia brought her doll to the party", the complete subject of the sentence is Leia. The complete predicate of the sentence is "brought her doll to the party". The anaphor is the pronoun "her", which refers back to the antecedent "Leia," therefore a relationship exists between "Leia" and "her." Language detection program 200 determines a level of proficiency based upon the SER. In subsequent iterations of language detection program 200, language detection program 200 attempts to minimize the SER as online learning improves language model 125 and/or as language detection program 200 selects an instance of language model 125 that is more closely related to audio stream 124. In some embodiments, language detection program 200 utilizes one or more of the aforementioned embodiments, to determine whether the meaning of acoustic model 126 changes from audio stream 124. In subsequent iterations of language detection program 200, language detection program 200 confirms or refutes the selection of language model 125, as the SER, WER, and probabilities either improve thereby confirming the selection, or decline thereby refuting the selection.

In step 216, language detection program 200 generates a confidence level for language model 125. The confidence level is a range of values that describes the certainty surrounding an estimate. Language detection program 200 generates a confidence level based on the correlation of the FFT, probability, WER and/or SER. Language detection program 200 generates a confidence level for language model 125 by applying curve fitment techniques. Language detection program 200 constructs a curve that best fits a series of data points based on the comparison of acoustic model 126 to audio stream 124 (e.g., generates a curve from the FFT correlation, calculated probabilities, WER, and/or SER from step 214). Language detection program 200 utilizes interval estimates along the generated curve to determine the frequency in which selection of the correct word occurs resulting in the confidence level which language detection program 200 maps to a language proficiency. The language proficiency provides an indication as to the ability of an individual to speak or perform in an acquired language (e.g., the level of competency of the speaker) in which the confidence interval maps to ranges of percentages that define the ratings (e.g., zero to five) of language proficiency.

For example, language proficiency is rated from zero to five (e.g., 0% to 100%). A zero rating (e.g., 0-20%) indicates the speaker does not possess a practical proficiency (e.g., unable to communicate). A one rating (e.g., 21-40%) one indicates the speaker has an elementary proficiency (e.g., routine travel needs, minimum courtesy, etc.). A two rating (e.g., 41-60%) indicates the speaker has a limited working proficiency (e.g., meets social requirements, limited work requirements). A three rating (e.g., 61-79%) indicates the speaker has a minimum professional proficiency (e.g., speaks sufficiently for practical, social, and professional settings). A four rating (e.g., 80-90%) indicated the speaker has a full professional proficiency (e.g., fluent and accurate in practical, social, and professional settings) A five rating (e.g., 91-100%) indicates the speaker is a native speaker and/or bilingual (e.g., born and/or educated in the language with fluent discourse in any setting).

In decision 218, language detection program 200 determines whether language model 125 is a best match. In one embodiment, language detection program 200 automatically identifies language model 125 as the best match. For example, within the first iteration of language detection program 200 a prior confidence level does not exist, therefore language detection program 200 determines language model 125 is a best match. In another embodiment, language detection program 200 determines whether language model 125 is the best match based on a comparison of the confidence level of the selected instance of language model 125 and the confidence level of best language model 129. If language detection program 200 determines the confidence level associated with the selected instance of language model 125 is equal to and/or greater than the confidence level associated with best language model 129, then language detection program 200 determines that the selected instance of language model 125 is the best match. Conversely, if language detection program 200 determines the confidence level associated with the selected instance of language model 125 is less than the confidence level associated with best language model 129, then language detection program 200 determines that the selected instance of language model 125 is not the best match.

In some other embodiment, language detection program 200 determines whether language model 125 is a best match based on the value of the language proficiency percentage and/or rating based on the confidence level meeting and/or exceeding a minimum rating and/or percentage. For example, language detection program 200 determines the language proficiency rating is at least a 4, in which the percentage is above 80% (e.g., minimum percentage allowed for providing closed captioning text 128 with streaming video 122 for audio stream 124), and language detection program 200 sets language model 125 as he best match. Conversely, language detection program 200 determines the percentage is 79% or below, with a rating of three or less, and determines language model 125 is not the best match. In yet some other embodiment, language detection program 200 utilizes one or more of the aforementioned embodiments to determine a best match. For example, language detection program 200 determines the selected instance of language model 125 is rated a four and best language model 129 is also rated a 4. However, the percentage for the selected instance of language model 125 is 83%, and the percentage for best language model 129 is 89%. Therefore language detection program 200 determines the selected instance of language model 125 is not the best match, and the best match remains best language model 129.

If language detection program 200 determines language model 125 is a best match (decision 218, yes branch), then language detection program 200 identifies language model 125 as the best language model 129 (step 220). If language detection program 200 determines language model 125 is not a best match (decision 218, no branch), then language detection program 200 determines whether additional instances of language model 125 are available for selection (decision 222).

In step 220, language detection program 200 identifies language model 125 as best language model 129. Language detection program 200 stores information pertaining language model 25 within best language model 129 (i.e., information that uniquely identifies language model 125, confidence level, percentages, rating, SER, WER, probabilities, etc.) for future comparisons. For example, in a second iteration of language detection program 200, language detection program 200 selects the same instance of language model 125 as the first iteration but includes the online learning from step 208, which thereby updates language model 125. Language detection program 200 determines whether the updates to language model 125: improve the language proficiency, decreases the language proficiency, or whether the proficiency remains the same. In some embodiments, language detection program 200 utilizes the information to determine which instance of language model 125 to select for the next iteration of language detection program 200 and/or whether additional instances of language model 125 are available for selection (decision 224).

In decision 222, language detection program 200 determines whether audio stream 124 ends. In one embodiment, language detection program 200 determines streaming video 122 ends (e.g., broadcast terminates) and thus audio stream 124 ends. In another embodiment, language detection program 200 determines audio stream 124 is no longer included in streaming video 122 (e.g., container no longer includes an audio format, the audio signal is changed to mute, etc.). In some other embodiment, language detection program 200 determines that streaming video 122 includes an audio format, however, audio stream 124 is blank (e.g., no sounds are present). Conversely, if language detection program 200 determines streaming video 122 continues and/or audio stream 124 is present (e.g., audio format is present in the container, audio stream includes speech, etc.) then language detection program 200 determines audio stream 124 is still active and does not end.

If language detection program 200 determines audio stream 124 ends (decision 222, yes branch), then language detection program 200 returns best language model 129 with the confidence level (step 226). If language detection program 200 determines 124 does not end (decision 222, no branch), then language detection program 200 determines whether additional instances of language model 125 are available for selection (decision 224).

In decision 224, language detection program 200 determines whether additional instances of language model 125 are available for selection. In one embodiment, language detection program 200 identifies instances of language model 125 that do not have a confidence level for possible selection (i.e., language detection program 200 has not previously utilized the instance of language model 125 to create closed captioning text 128). In another embodiment, language detection program 200 identifies instances of language model 125 with confidence levels that are greater than or equal to a minimum proficiency. For example language detection program 200 identifies instances of language model 125 that are rated four or higher. In some other embodiment, language detection program 200 identifies instances of language model 125 that include an increasing confidence level (e.g., each subsequent iteration of language detection program 200 indicates an improvement in the generated confidence level value, minimum proficiency rating is not yet met, however the confidence level is increasing). In some other embodiment, language detection program 200 identifies additional instance of language model 125 in which the confidence level is greater than the current confidence level. For example, the confidence level associated with a first instance of language model 125 no longer increasing with each subsequent iteration of language detection program 200. Language detection program 200 selects a second instance of language model 125, and determines the confidence level decreases. If language detection program 200 determines an additional instance of language model 125 is available for selection, then language detection program 200 selects a third instance of language model 125. However, if language detection program 200 determines an additional instance of language model 125 is not available for selection language detection program 200, then language detection program 200 reselects the first instance of language model 125 with the higher confidence level.

If language detection program 200 determines additional instances of language model 125 are available for selection (decision 224, yes branch), then language detection program 200 selects another instance of language model 125 (step 206). If language detection program 200 determines additional instances of language model 125 are not available for selection (decision 224, no branch), then language detection program 200 returns best language model 129 with the confidence level (step 226).

In step 226, language detection program 200 returns best language model 129 with the confidence level. In one embodiment, language detection program 200 stores best language model 129 with the confidence level associated with streaming video 122. In another embodiment, language detection program 200 provides best language model 129 and the confidence level to the user via user interface 112. The user may then select to utilize best language model 129 to continue providing closed captioning text 128 for streaming video 122. In some other embodiment, language detection program 200 selects best language model 129 to continue providing closed captioning text 128 for streaming video 122 (e.g., no additional instance of language model 125 exists that is better than best language model 129).

Figure 3:
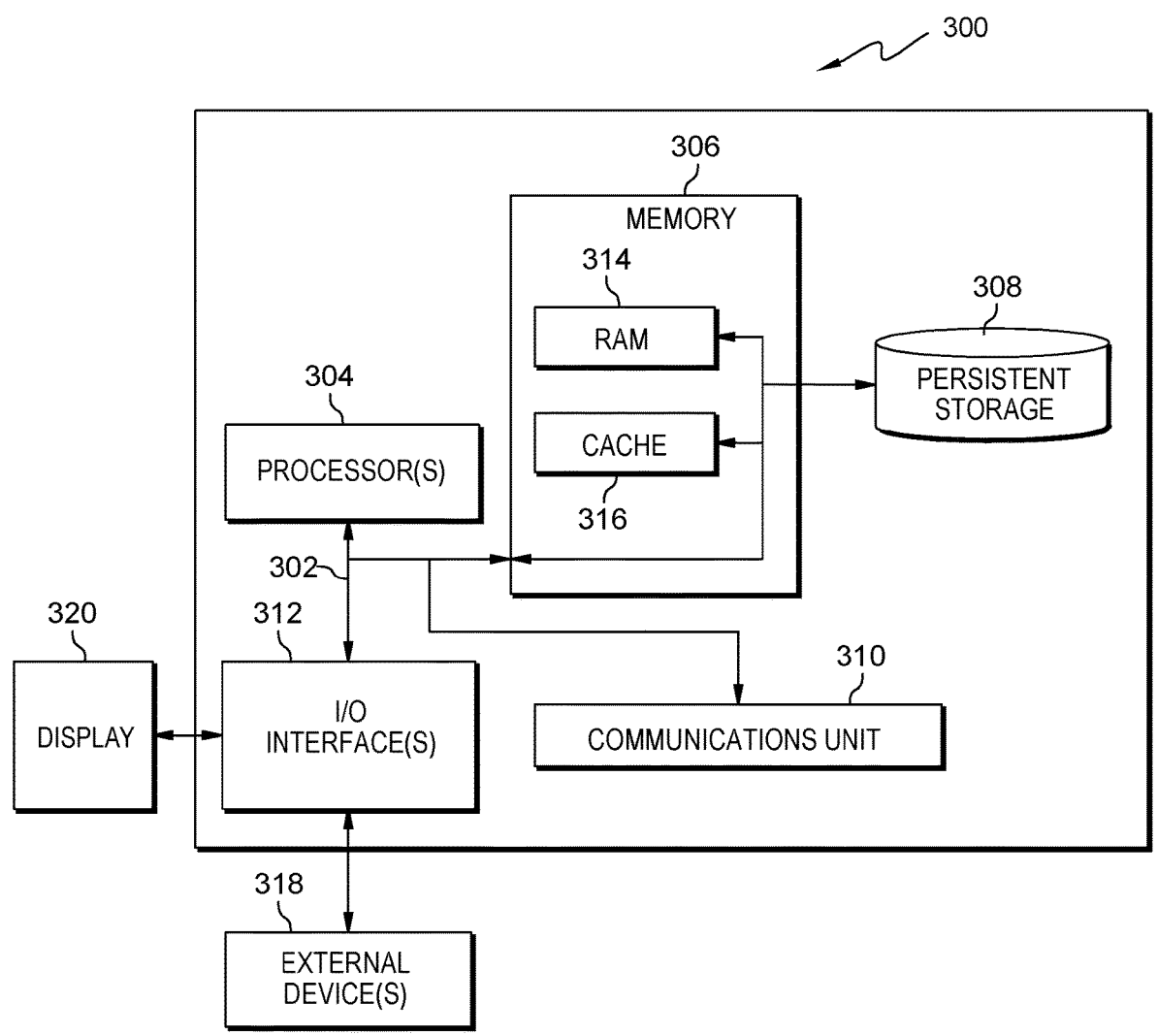
FIG. 3 is a block diagram of components of the server executing the language detection program, in accordance with an embodiment of the present invention.

FIG. 3 depicts a block diagram of components of server 300 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM) 314. In general, memory 306 can include any suitable volatile or non-volatile computer readable storage media. Cache 316 is a fast memory that enhances the performance of computer processor(s) 304 by holding recently accessed data, and data near accessed data, from memory 306.

User interface 112, streaming video 122, audio stream 124, language model 125, acoustic model 126, closed captioning text 128, best language model 129, and language detection program 200 may be stored in persistent storage 308 and in memory 306 for execution and/or access by one or more of the respective computer processor(s) 304 via cache 316. In an embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. User interface 112, streaming video 122, audio stream 124, language model 125, acoustic model 126, closed captioning text 128, best language model 129, and language detection program 200 may be downloaded to persistent storage 308 through communications unit 310.

I/O interface(s) 312 allows for input and output of data with other devices that may be connected to server 300. For example, I/O interface(s) 312 may provide a connection to external device(s) 318, such as a keyboard, a keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., user interface 112, streaming video 122, audio stream 124, language model 125, acoustic model 126, closed captioning text 128, best language model 129, and language detection program 200, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for acoustic modeling with a language model, the method comprising:
   isolating, by one or more computer processors, an audio stream comprising a set of words;
   identifying, by one or more computer processors, one or more language models based at least in part on the isolated audio stream;
   selecting, by one or more computer processors, a language model from the identified one or more language models based on the isolated audio stream;
   creating, by one or more computer processor, a text based on the selected language model and the isolated audio stream;
   creating, by one or more computer processors, an acoustic model based on the created text, wherein the acoustic model corresponds to a combination of utterances of the set of words;
   comparing, by one or more computer processors, the created acoustic model and the isolated audio stream based on a probability function of the created acoustic model to the isolated audio stream, wherein the probability function is configured to determine a probability that one or more words from the isolated audio stream are correctly presented in the created acoustic model;
   generating, by one or more computer processors, a confidence level corresponding to the created acoustic model based on the comparison of the created acoustic model and the isolated audio stream; and
   selecting, by one or more computer processors, a highest ranked language model based at least in part on the generated confidence level.

2. The method of claim 1, further comprising:
   performing, by one or more computer processors, machine learning for the selected language model based on the isolated audio stream; and
   updating, by one or more computer processors, the selected language model with the performed machine learning.

3. The method of claim 1, further comprising:
   determining, by one or more computer processors, whether an another language model exists within the identified one or more language models;
   responsive to determining the another language model exists, selecting, by one or more computer processors, the another language model from the identified one or more language models;
   creating, by one or more computer processor, an another text based on the selected another language model and the isolated audio stream;
   creating, by one or more computer processors, an another acoustic model based on the created another text; and
   generating, by one or more computer processors, an another confidence level associated with the created another acoustic model.

4. The method of claim 1, wherein selecting, by one or more computer processors, the language model from the identified one or more language models based on the isolated audio stream further comprises;
   receiving, by one or more computer processors, a latency delay;
   analyzing, by one or more computer processors, a sample of the isolated audio stream based on the received latency delay;
   identifying, by one or more computer processors, one or more words within the isolated audio stream;
   identifying, by one or more computer processors, a number of overall words for the identified one or more words that are included within each instance of the identified one or more language models; and
   selecting, by one or more computer processors, the language model from the identified one or more language models based on the identified number of overall words, wherein the selected language model is based on a highest number of included words.

5. The method of claim 1, wherein generating a confidence level associated with the created acoustic model further comprises:
   comparing, by one or more computer processors, the created acoustic model and the isolated audio stream, based on one or more of the following:
   a probability of the created acoustic model to the isolated audio stream;
   a word error rate of the created acoustic model to the isolated audio stream; and
   a semantic error rate of the created acoustic model to the isolated audio stream.

6. The method of claim 5, further comprising:
generating, by one or more computer processors, a curve based on a comparison of the created acoustic model and the isolated audio stream; and
determining, by one or more computer processors, the confidence level based on interval estimates of the generated curve.

7. The method of claim 1, wherein selecting the highest ranked language model based at least in part on the generated confidence level further comprises:
comparing, by one or more computer process, the generated confidence level to an another generated confidence level;
identifying, by one or more computer processors, a higher confidence level based on the comparison of the generated confidence level to the another generated confidence level; and
selecting, by one or more computer processors, the highest ranked language model based on the identified higher confidence level.

8. A computer program product for acoustic modeling with a language model, the computer program product comprising:
one or more computer readable storage media and program instructions stored on the one or more computer readable storage media, the program instructions comprising:
program instructions to isolate an audio stream comprising a set of words;
program instructions to identify one or more language models based at least in part on the isolated audio stream;
program instructions to select a language model from the identified one or more language models based on the isolated audio stream;
program instructions to create a text based on the selected language model and the isolated audio stream;
program instructions to create an acoustic model based on the created text, wherein the acoustic model corresponds to a combination of utterances of the set of words;
program instructions to compare the created acoustic model and the isolated audio stream based on a probability function of the created acoustic model to the isolated audio stream, wherein the probability function is configured to determine a probability that one or more words from the isolated audio stream are correctly presented in the created acoustic model;
program instructions to generate a confidence level corresponding to the created acoustic model based on the comparison of the created acoustic model and the isolated audio stream; and
program instructions to select a highest ranked language model based at least in part on the generated confidence level.

9. The computer program product of claim 8, further comprising program instructions, stored on the one or more computer readable storage media, to:
perform machine learning for the selected language model based on the isolated audio stream; and
update the selected language model with the performed machine learning.

10. The computer program product of claim 8, further comprising program instructions, stored on the one or more computer readable storage media, to:
determine whether an another language model exists within the identified one or more language models;
responsive to determining the another language model exists, select the another language model from the identified one or more language models;
create an another text based on the selected another language model and the isolated audio stream;
create an another acoustic model based on the created another text; and
generate an another confidence level associated with the created another acoustic model.

11. The computer program product of claim 8, wherein selecting, by one or more computer processors, the language model from the identified one or more language models based on the isolated audio stream further comprises program instructions, stored on the one or more computer readable storage media, to:
receive a latency delay;
analyze a sample of the isolated audio stream based on the received latency delay;
identify one or more words within the isolated audio stream;
identify a number of overall words for the identified one or more words that are included within each instance of the identified one or more language models; and
select the language model from the identified one or more language models based on the identified number of overall words, wherein the selected language model is based on a highest number of included words.

12. The computer program product of claim 8, wherein generating the confidence level associated with the created first acoustic model further comprises program instructions, stored on the one or more computer readable storage media, to:
compare the created acoustic model and the isolated audio stream, based on one or more of the following:
a probability of the created acoustic model to the isolated audio stream;
a word error rate of the created acoustic model to the isolated audio stream; and
a semantic error rate of the created acoustic model to the isolated audio stream.

13. The computer program product of claim 12, further comprising program instructions, stored on the one or more computer readable storage media, to:
generate a curve based on a comparison of the created acoustic model and the isolated audio stream; and
determine the confidence level based on interval estimates of the generated curve.

14. The computer program product of claim 8, wherein selecting the highest ranked language model based at least in part on the generated confidence level further comprises program instructions, stored on the one or more computer readable storage media, to:
compare the generated confidence level to an another generated confidence level;
identify a higher confidence level based on the comparison of the generated confidence level to the another generated confidence level; and
select the highest ranked language model based on the identified higher confidence level.

15. A computer system for acoustic modeling with a language model, the computer system comprising:
one or more computer processors, one or more computer readable storage media, and program instructions stored on the computer readable storage media for execution by at least one of the one or more processors, the program instructions comprising:

program instructions to isolate an audio stream;
program instructions to identify one or more language models based at least in part on the isolated audio stream;
program instructions to select a language model from the identified one or more language models based on the isolated audio stream;
program instructions to create a text based on the selected language model and the isolated audio stream;
program instructions to create an acoustic model based on the created text;
program instructions to compare the created acoustic model and the isolated audio stream based on a probability function of the created acoustic model to the isolated audio stream, wherein the probability function is configured to determine a probability that one or more words from the isolated audio stream are correctly presented in the created acoustic model;
program instructions to generate a confidence level corresponding to the created acoustic model based on the comparison of the created acoustic model and the isolated audio stream; and
program instructions to select a highest ranked language model based at least in part on the generated confidence level.

16. The computer system of claim 15, further comprising program instructions, stored on the one or more computer readable storage media, to:
perform machine learning for the selected language model based on the isolated audio stream; and
update the selected language model with the performed machine learning.

17. The computer system of claim 15, further comprising program instructions, stored on the one or more computer readable storage media, to:
determine whether an another language model exists within the identified one or more language models;
responsive to determining the another language model exists, select the another language model from the identified one or more language models;
create an another text based on the selected another language model and the isolated audio stream;
create an another acoustic model based on the created another text; and
generate an another confidence level associated with the created another acoustic model.

18. The computer system of claim 15, wherein selecting, by one or more computer processors, the language model from the identified one or more language models based on the isolated audio stream further comprises program instructions, stored on the one or more computer readable storage media, to:
receive a latency delay;
analyze a sample of the isolated audio stream based on the received latency delay;
identify one or more words within the isolated audio stream;
identify a number of overall words for the identified one or more words that are included within each instance of the identified one or more language models; and
select the language model from the identified one or more language models based on the identified number of overall words, wherein the selected language model is based on a highest number of included words.

19. The computer system of claim 15, wherein generating the confidence level associated with the created acoustic model further comprises program instructions, stored on the one or more computer readable storage media, to:
compare the created acoustic model and the isolated audio stream, based on one or more of the following:
a probability of the created acoustic model to the isolated audio stream;
a word error rate of the created acoustic model to the isolated audio stream; and
a semantic error rate of the created acoustic model to the isolated audio stream.

20. The computer system of claim 19, further comprising program instructions, stored on the one or more computer readable storage media, to:
generate a curve based on a comparison of the created acoustic model and the isolated audio stream; and
determine the confidence level based on interval estimates of the generated curve.

* * * * *